(12) United States Patent
Norris (10) Patent No.: US 8,410,451 B2
(45) Date of Patent: Apr. 2, 2013

(54) NEUTRON FLUORESCENCE WITH SYNCHRONIZED GAMMA DETECTOR

(75) Inventor: Wayne B. Norris, Santa Barbara, CA (US)

(73) Assignee: BOSS Physical Sciences LLC, Troy, MI (US)

( * ) Notice: Subject to any disclaimer, the term of this patent is extended or adjusted under 35 U.S.C. 154(b) by 0 days.

(21) Appl. No.: 13/263,785

(22) PCT Filed: Apr. 9, 2010

(86) PCT No.: PCT/US2010/030455
§ 371 (c)(1),
(2), (4) Date: Oct. 10, 2011

(87) PCT Pub. No.: WO2011/002537
PCT Pub. Date: Jan. 6, 2011

(65) Prior Publication Data
US 2012/0037812 A1   Feb. 16, 2012

Related U.S. Application Data

(60) Provisional application No. 61/167,902, filed on Apr. 9, 2009.

(51) Int. Cl.
*G01N 23/22* (2006.01)
(52) U.S. Cl. .......................... 250/393; 250/395
(58) Field of Classification Search ............... 250/393
See application file for complete search history.

(56) References Cited

U.S. PATENT DOCUMENTS 3,463,922 A * 8/1969 Martinez, Jr. et al. ... 250/363.01
3,781,564 A   12/1973 Lundberg
(Continued)

FOREIGN PATENT DOCUMENTS
EP   1882929 A   1/2008
JP   2099811 A   4/1990
(Continued)

OTHER PUBLICATIONS

Kwan et al., Bulk Explosives Detection Using Nuclear Resonant Absorption Technique, Plasma Science, Jun. 2-5, 2003, p. 396.
(Continued)

*Primary Examiner* — Marcus Taningco (74) *Attorney, Agent, or Firm* — Endurance Law Group, PLC (57) ABSTRACT

Method and apparatus for minimizing signal noise (20, 22) in thermal, epithermal, and cold neutron fluorescence processes using neutron flux modulation and gamma ray detector pulse gating synchronized to neutron time of flight (NTOF). The apparatus includes a source (12) of thermal, epithermal, and/or cold neutrons, optionally switched between flux or power settings in various embodiments, a gamma ray detector (14) or detection system capable of either being turned ON and OFF, in some embodiments, or else being told to regard or disregard gamma ray signals (20, 22) in other embodiments, a control mechanism (24), and either a target range detector (26) or a prior measurement of target range, in embodiments where the range remains fixed. The gamma ray detector (14) is synchronized to the NTOF by the control mechanism (24) so that it remains switched OFF during the pulse period of the neutron source (12) and for the subsequent NTOF so that any nuisance signals (20, 22) arriving at the detector (14) during these times are not detected or considered.

20 Claims, 7 Drawing Sheets

U.S. PATENT DOCUMENTS

| | | |
|---|---|---|
| 3,832,545 A | 8/1974 | Bartko |
| 4,529,571 A | 7/1985 | Bacon et al. |
| 4,613,756 A | 9/1986 | Iwanczyk et al. |
| 4,616,833 A | 10/1986 | Geller |
| 4,851,687 A | 7/1989 | Ettinger et al. |
| 4,882,121 A | 11/1989 | Grenier |
| 4,941,162 A | 7/1990 | Vartsky et al. |
| 4,987,582 A | 1/1991 | Webster et al. |
| 5,006,299 A | 4/1991 | Gozani et al. |
| 5,040,200 A | 8/1991 | Ettinger et al. |
| 5,076,993 A | 12/1991 | Sawa et al. |
| 5,078,952 A | 1/1992 | Gozani et al. |
| 5,080,856 A | 1/1992 | Grenier et al. |
| 5,114,662 A | 5/1992 | Gozani et al. |
| 5,124,554 A | 6/1992 | Fowler et al. |
| 5,153,439 A | 10/1992 | Gozani et al. |
| 5,159,617 A | 10/1992 | King et al. |
| 5,247,177 A | 9/1993 | Goldberg et al. |
| 5,278,418 A | 1/1994 | Broadhurst |
| 5,293,414 A | 3/1994 | Ettinger et al. |
| 5,388,128 A | 2/1995 | Gozani |
| 5,410,156 A | 4/1995 | Miller |
| 5,410,575 A | 4/1995 | Uhm |
| 5,420,905 A | 5/1995 | Bertozzi |
| 5,600,303 A | 2/1997 | Husseiny et al. |
| 5,606,167 A | 2/1997 | Miller |
| 5,692,029 A | 11/1997 | Husseiny et al. |
| 5,838,759 A | 11/1998 | Armistead |
| 5,847,398 A | 12/1998 | Shahar et al. |
| 5,880,469 A | 3/1999 | Miller |
| 5,982,838 A | 11/1999 | Vourvopoulos |
| 6,215,122 B1 | 4/2001 | Clifford et al. |
| 6,341,150 B1 | 1/2002 | Ivanov et al. |
| 6,393,085 B1 | 5/2002 | Heller et al. |
| 6,399,951 B1 | 6/2002 | Paulus et al. |
| 6,444,994 B1 | 9/2002 | Ohmori et al. |
| 6,563,898 B1 | 5/2003 | Vourvopoulos et al. |
| 6,906,559 B2 | 6/2005 | Tuemer |
| 6,922,455 B2 | 7/2005 | Jurczyk et al. |
| 6,928,131 B2 | 8/2005 | Olshansky et al. |
| 7,151,447 B1 | 12/2006 | Willms et al. |
| 7,151,815 B2 | 12/2006 | Ruddy et al. |
| 7,313,221 B2 | 12/2007 | Sowerby et al. |
| 7,362,842 B2 | 4/2008 | Leung |
| 7,385,201 B1 | 6/2008 | Joung et al. |
| 7,405,409 B2 | 7/2008 | Kearfott |
| 7,430,479 B1 | 9/2008 | Holslin et al. |
| 7,461,032 B2 | 12/2008 | Heaton et al. |
| 7,501,624 B1 | 3/2009 | Farrell et al. |
| 7,505,544 B2 | 3/2009 | Jestice |
| 7,554,089 B2 | 6/2009 | Burr et al. |
| 2002/0121603 A1 | 9/2002 | Wong et al. |
| 2002/0131543 A1 | 9/2002 | Leung |
| 2003/0161526 A1 | 8/2003 | Jupiter et al. |
| 2003/0165212 A1* | 9/2003 | Maglich ................. 376/156 |
| 2004/0008810 A1 | 1/2004 | Nelson et al. |
| 2004/0036025 A1 | 2/2004 | Wong et al. |
| 2004/0228433 A1 | 11/2004 | Magill et al. |
| 2004/0251400 A1 | 12/2004 | Moses et al. |
| 2005/0058352 A1 | 3/2005 | Deliwala |
| 2005/0069073 A1 | 3/2005 | Ogura et al. |
| 2005/0135534 A1 | 6/2005 | Jones et al. |
| 2005/0139775 A1 | 6/2005 | Gono et al. |
| 2006/0140326 A1 | 6/2006 | Rowland et al. |
| 2006/0202125 A1 | 9/2006 | Suhami |
| 2006/0210007 A1 | 9/2006 | Koskelo et al. |
| 2007/0295911 A1 | 12/2007 | Sved |
| 2008/0011052 A1 | 1/2008 | Kondo et al. |
| 2008/0017806 A1 | 1/2008 | Norris |
| 2008/0128631 A1 | 6/2008 | Suhami |
| 2008/0192897 A1 | 8/2008 | Piorek et al. |
| 2008/0203309 A1 | 8/2008 | Frach et al. |
| 2009/0095895 A1 | 4/2009 | Dent |
| 2009/0114834 A1* | 5/2009 | Pekarsky ............. 250/390.04 |
| 2010/0025573 A1 | 2/2010 | Hahto et al. |
| 2010/0219345 A1 | 9/2010 | Franch et al. |
| 2010/0223010 A1 | 9/2010 | Nikitin et al. |

FOREIGN PATENT DOCUMENTS

| | | |
|---|---|---|
| JP | 2001051094 A | 2/2001 |
| KR | 100716495 B1 | 5/2007 |
| WO | 9016072 A | 12/1990 |
| WO | 9857194 A | 12/1998 |
| WO | 0194984 A | 12/2001 |
| WO | 03040713 A | 5/2003 |
| WO | 2004043740 A | 5/2004 |
| WO | 2005008285 A | 1/2005 |
| WO | 2006016835 A | 2/2006 |

OTHER PUBLICATIONS

Dogan et al., "Efficiency and angular resolution calculations for a prototype multiple Compton scatter camera," 1994, Nuclear Instruments and Methods in Physics Research A, vol. 345, pp. 296-302.

\* cited by examiner

NEUTRON FLUORESCENCE WITH SYNCHRONIZED GAMMA DETECTOR

CROSS REFERENCE TO RELATED APPLICATIONS

This application claims priority to U.S. Provisional Patent Application No. 61/167,902 filed Apr. 9, 2009, the entire disclosure of which is hereby incorporated by reference and relied upon.

BACKGROUND OF THE INVENTION

1. Field of the Invention

The present disclosure relates generally to the use of neutron emission to detect a substance of interest in a remote target via gamma ray fluorescence, and more specifically toward a method and system for improved gamma ray signal detection.

2. Related Art

The use of emitted neutrons to identify substances of interest in distant targets is an emerging technology. For example, the apparatus and methods described in U.S. Pat. No. 7,573,044, issued Aug. 11, 2009 to Norris, the inventor of the subject invention, directs a neutron beam of thermal, epithermal, or cold neutrons toward a remote target or area to interrogate for possible substances of interest. It is to be understood that the term "target" may be a specific suspicious object like a suitcase or a parked car, an indiscriminate area under investigation, or almost any other desired focus of an interrogation. The detection and analysis of gamma rays returning from the target enable a determination whether the target or its immediate surroundings contain significant concentrations of the substance(s) of interest. Substances of interest may be hostile, as in hidden explosives detection, or benign, as in the detection of certain minerals in connection with mining operations. Diverse applications of this technology abound. The entire disclosure of U.S. Pat. No. 7,573,044 is hereby incorporated by reference and relied upon.

Neutrons sent to interrogate a target will typically produce a broad range of reactions both in the target and also in virtually all other substances that are exposed to the neutrons including, but not limited to, materials in the neutron source itself, shielding and the materials used to produce the neutrons, the intervening atmosphere with all its constituents, materials surrounding the target in all directions (including objects beside, in front of, and behind the target), and uninteresting substances commingled with the target.

Signals resulting from interactions with the target are referred to as signals of interest. Signals resulting from interactions other than from the target are referred to variously as background signals, nuisance signals, or simply as noise. Gamma ray signals received by the detector are the sum of all signals produced by all sources, including signals of interest and noise. The challenge for all detection systems is to distinguish between signals of interest and signals due to noise.

Two significant contributors to noise gamma rays in the field of neutron fluorescence are fratricidal and backshine gammas. All neutron sources tend to directly produce unwanted gamma rays as byproducts. These byproduct gamma rays are sometimes referred to as "fratricidal" gamma rays, since they typically degrade the mission of the device from which they emanate. Gamma ray detectors used as part of a substance identification system cannot be completely shielded from fratricidal gamma rays. Gamma rays produced as a direct result of neutron production thus constitute a source of noise or nuisance signal for the gamma ray detectors. Further, unwanted or nuisance gamma rays may be produced by the interaction of the neutron beam with atmospheric nitrogen as the beam travels toward the substance of interest. These unwanted gamma rays are sometimes referred to as "atmospheric backshine gammas" or "atmospheric sparkle gamma rays," and constitute additional noise or nuisance signals. The ratio of signals of interest to signals due to noise is known as the "Signal-to-Noise Ratio" (SNR).

One proposed strategy for reducing signal noise is to implement methods that reduce the production of unwanted gamma signals. For example, the applicant's co-pending patent application Ser. No. PCT/US09/65706, filed Nov. 24, 2009, describes strategies for modulating the illuminating neutron beam flux to improve the SNR, among other objectives, by adjusting the signal of interest. Background noise effects are reduced relative to the total received signal using target-distance measurement, other parameters, and computerized algorithms to modulate the neutron beam flux. The entire disclosure of patent application Ser. No. PCT/US09/65706 is hereby incorporated by reference and relied upon.

Other prior art examples include U.S. Pat. No. 7,430,479 to Holslin et al., issued Sep. 30, 2008, which discloses a method for interrogating suspicious objects for hidden explosives or contraband via gamma ray emission stimulated by a pulsed neutron source. A "fast" neutron interrogation beam is used (14 MeV) as opposed to a "thermal" neutron interrogation beam. A gated gamma ray detector monitors the return of gamma rays between pulses, with the die-off of the slow-decay species being observed over time for the purpose of substance analysis. The pulse provides quiet "gates" for resolving or disambiguating neutron burst/inelastic gammas, capture gammas, and activation gammas.

U.S. Publication No. 2008/0203309 to Frach et al., published Aug. 28, 2008, describes a gamma ray detector system with a time of flight positron emission tomography imaging feature. In particular, a time of flight processor localizes a positron-electron annihilation event along the line of response based on a time difference between two substantially simultaneous gamma ray detections. This publication recognizes a "time of flight" event with respect to emitted neutrons.

U.S. Pat. No. 5,153,439 to Gozani et al., issued Oct. 6, 1992, describes a fairly basic application of thermal neutron activation analysis techniques, where the use of neutrons in general, with unspecified energy, is used with an Artificial Neural Network to process gamma ray data. The description includes a discussion of subtracting noise from a returning gamma ray signal, but without teaching a specific method for recognizing and discriminating noise from good signal.

U.S. Pat. No. 5,838,759 to Armistead, issued Nov. 17, 1998, describes an inspection system for cargo containers using a fast neutron interrogation beam. Neutrons penetrating the container are thermalized or slowed by several ambient mechanisms, including inelastic and elastic scattering, but the degree of thermalization is not and cannot be controlled, since the neutrons encounter unknown quantities and geometries of numerous atomic species. Such neutrons as are thermalized by this process are then absorbed by certain elements in the target which give off gamma rays for detection.

U.S. Patent Publication No. 2010/0025573 to Hahto et al., published Feb. 4, 2010, proposes a method to produce short neutron pulses at a current of more than 1 milliamp of protons at 9.17 MeV.

Challengingly low SNR is a common problem encountered generally in this field. High levels of noise or nuisance gamma rays make the detection of gamma rays of interest more difficult. Despite the abundance of development activity in this area, there remains a desire for improved signal detection methods to provide faster and more accurate identification of substances of interest in a remote target. Specifically, there exists a need to address the issue of unwanted fratricidal-type and atmospheric backshine type gamma rays in connection with detection strategies in this field.

SUMMARY OF THE INVENTION

The present invention relates generally to the use of flux modulation or pulsing of neutron emissions, synchronized to the time of flight of a packet or cloud of neutrons, combined with time-gating of an associated gamma ray detector, to minimize noise signals received by the gamma ray detector. A remotely located target is provided, together with a neutron source and a gamma ray detector. The neutron source has power ON and OFF modes, and is operable in its ON mode to emit neutrons capable of traveling over time and distance to reach the target. Neutrons interacting with the target will produce characteristic gamma rays of interest if they encounter a substance of interest. The travel time of the emitted neutrons to the target defines a neutron time of flight (NTOF). The gamma ray detector also has power ON and OFF modes, and is operable in its ON mode only to detect gamma ray signals. The method includes powering ON the neutron source for a pulse period and then powering OFF the neutron source. The gamma ray detector is constrained in its OFF mode during the pulse period and for an immediately subsequent additional period of time generally equal to the NTOF. Then, the gamma ray detector is powered ON. Any unwanted nuisance gamma signals produced during the pulse period and the subsequent NTOF period are not detected by the gamma ray detector because it is in the OFF mode. Alternatively, the gamma ray detector may substitute an IGNORE mode for its OFF mode. During IGNORE mode, detected gamma ray counts may be truly ignored, or may be compiled for purposes other than the detection of signals of interest.

The present invention provides also an apparatus for generating one or more pulses of thermal, epithermal, or cold neutrons to illuminate a substance of interest for the purpose of stimulating it to produce gamma rays, and a gamma ray detector gated so as to minimize the amount of fratricidal gamma rays and atmospheric backshine gamma rays that it detects. Between pulses, when the neutron source is either switched OFF or set to a very low neutron flux value, the flux of noise gammas is either much less than it would be during the pulse or actually zero. Detector time gating enables the exclusion of fratricidal gamma rays and atmospheric backshine gamma rays produced at times when the substance of interest is not being illuminated by neutrons.

This invention takes advantage of the fact that the time of flight of a pulsed neutron beam or emission to a remote target is typically on the order of several milliseconds—sufficient to cycle ON and OFF a neutron source. The gamma ray detector is not switched ON until the time one can expect gamma ray signals of interest to be arriving at the detector. This timing is based on the time of flight of the neutrons and possibly also the returning gamma rays (although the latter travel so much faster than neutrons that gamma ray flight times, which would be measured in tens of nanoseconds in the present invention, may be neglected in most applications). The switching ON and OFF of the gamma ray detector is therefore a function of the target distance. As a consequence, the invention improves the effective SNR as compared with prior art techniques.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
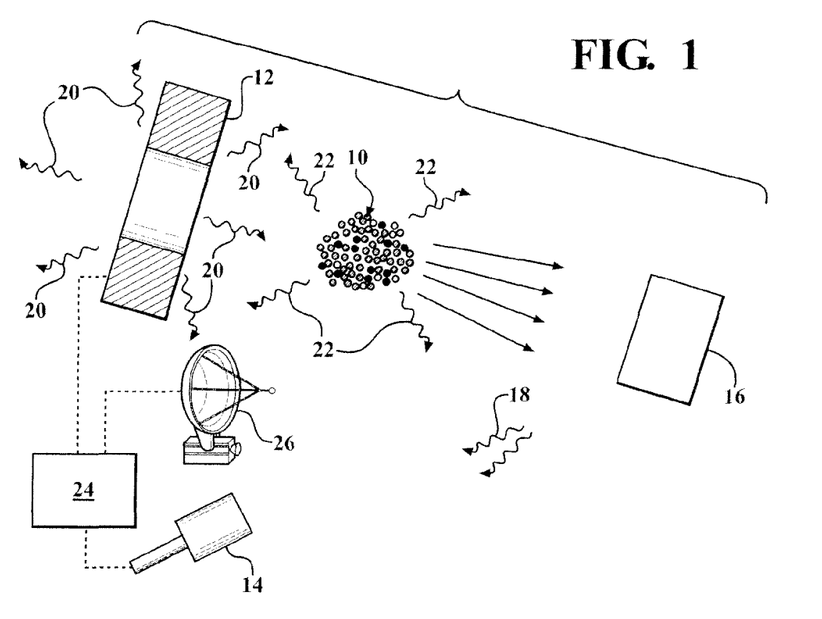
FIG. 1 illustrates graphically an apparatus for minimizing nuisance or noise signal due to gamma rays created during the detection of substances of interest by the mechanism of neutron irradiation, in accordance with one embodiment of the present invention.

Referring to the figures wherein like numerals indicate like or corresponding parts throughout the several views, the process of thermal neutron activation analysis (TNAA) is graphically depicted in FIG. 1, where a cloud or packet of thermal neutrons 10 is emitted by a pulsed neutron source 12. That is to say, the neutrons 10 are emitted in pulses, resulting in a series of neutron clouds or packets 10, rather than as a continuous stream. Conventional elements, such as housings, mountings, supports, electrical power supplies, external radiation shielding, etc. are omitted from the figures for clarity.

The neutron source 12 may be any suitable source for creating an emission 10 of thermal, epithermal, or cold neutrons, including but not limited to those examples provided in the prior art references cited above. The neutron source 12 produces a pulsed neutron beam 10 by deliberately cycling between ON and OFF modes with a switch or switch-like feature actuated by a control mechanism 24, described in greater detail below. It should be understood that the actual mechanism for powering ON the neutron source 12 may include adjusting and/or varying its neutron flux setting within a range of effective settings by any method. Likewise, powering OFF or switching OFF the neutron source 12 between pulses may include setting the source 12 to a very low neutron flux value rather than absolute zero. In other words, the neutron source 12 is a switchable, i.e., pulsed, neutron source capable of being switched between different power or flux levels, including but not limited to power settings OFF and ON, 10% and 90%, etc., and that the terms ON and OFF may refer to "some effective level of neutron flux" and "some non-effective neutron flux", respectively.

Figure 2:
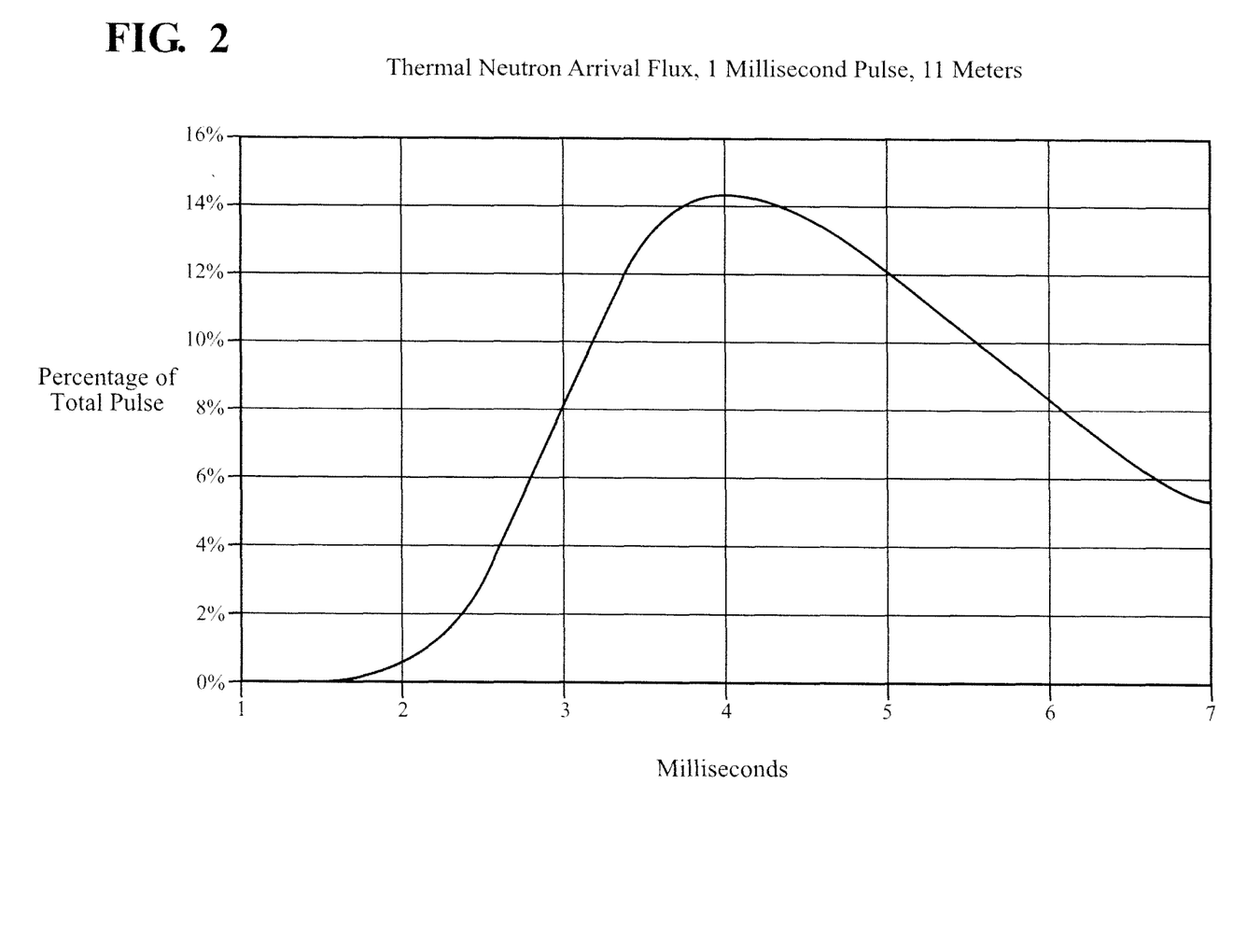
FIG. 2 is an exemplary chart showing the population of thermal neutrons arriving at a gamma ray detector as a function of time, for a substance of interest located approximately 11 meters from the neutron source, resulting from a 1 millisecond thermal neutron pulse.

Cold, thermal, and epithermal neutrons 10 travel several thousands of miles per hour. Gamma rays, by comparison, travel at the speed of light, more than ⅔ billion miles per hour, and hence travel thousands of times faster than the velocity of cold, thermal, or epithermal neutrons. The relatively slow neutrons 10 move outward from the neutron source 12. As they do so, they produce gamma rays as they encounter most kinds of atomic nuclei, such as the nuclei in the atoms in air. The much faster gamma rays generated by the neutron interactions with nuclei in their paths are detected by a gamma ray detector 14 nearly instantly after they are produced. Thus, gamma rays that are produced immediately after a neutron cloud leaves the neutron source arrive at the detector 14 significantly earlier than those produced after the neutron could has been traveling for some time. With the arrangement of the neutron source 12 and the detector 14 as shown in the diagram, this would mean that the gamma rays produced at locations close to the detector 14 arrive significantly earlier than those that are produced far from the detector 14. Since the neutron pulse contains neutrons exhibiting a distribution of speeds, the pulse spreads out as it travels, meaning that the gamma rays generated at each distance arrive over time. This is exemplified in FIG. 2, where the population of thermal neutrons 10 is shown arriving at a gamma ray detector as a function of time, for a substance of interest in a target 16 located 11 meters from the neutron source 12, and for a 1 millisecond thermal neutron pulse. Note that epithermal neutrons would arrive more quickly than the thermal neutrons upon which FIG. 2 is predicated, and cold ones more slowly, based on their respective velocities/times of flight.

In general, in the context of interrogation procedures contemplated by this invention, a remote interrogation target 16 is located relatively far from the neutron source 12 and the gamma ray detector 14, perhaps on the order of 10 to 20 meters for explosives detection operations and possibly closer for other types of measurements. The target 16 is interrogated with neutrons 10 to determine whether it contains significant levels of a substance of interest. A substance of interest may be any suitable element or compound that produces measurable gamma rays in this application including, but not limited to, nitrogen-14 ($^{14}$N), plutonium-239 ($^{239}$Pu), uranium-235 ($^{235}$U), chlorine, copper, aluminum, boron, carbon or hydrogen in coal (for grading purposes), and the like.

Figure 3:
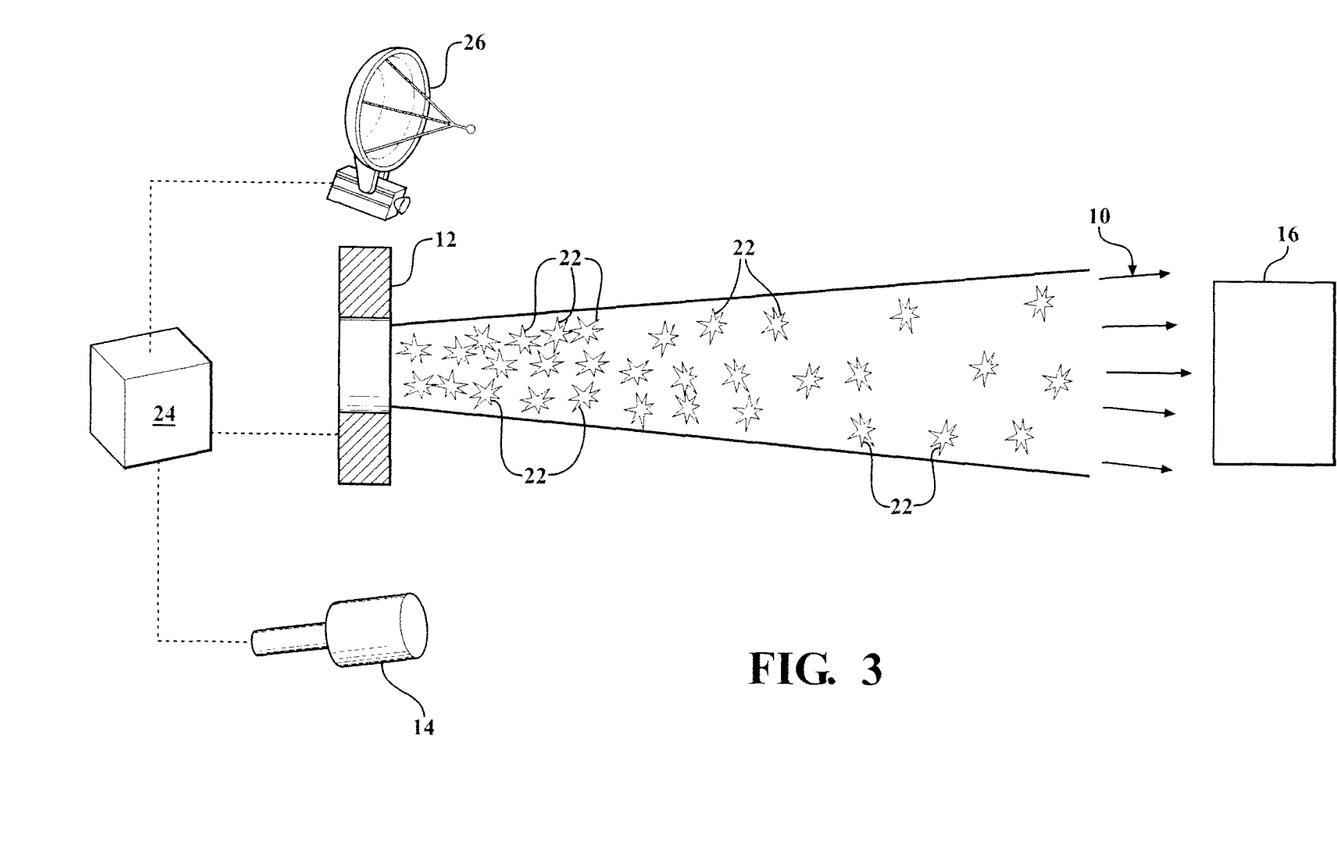
FIG. 3 is a schematic illustration depicting the phenomenon of atmospheric nitrogen gamma ray "backshine" or "sparkle;"
Figure 4A:
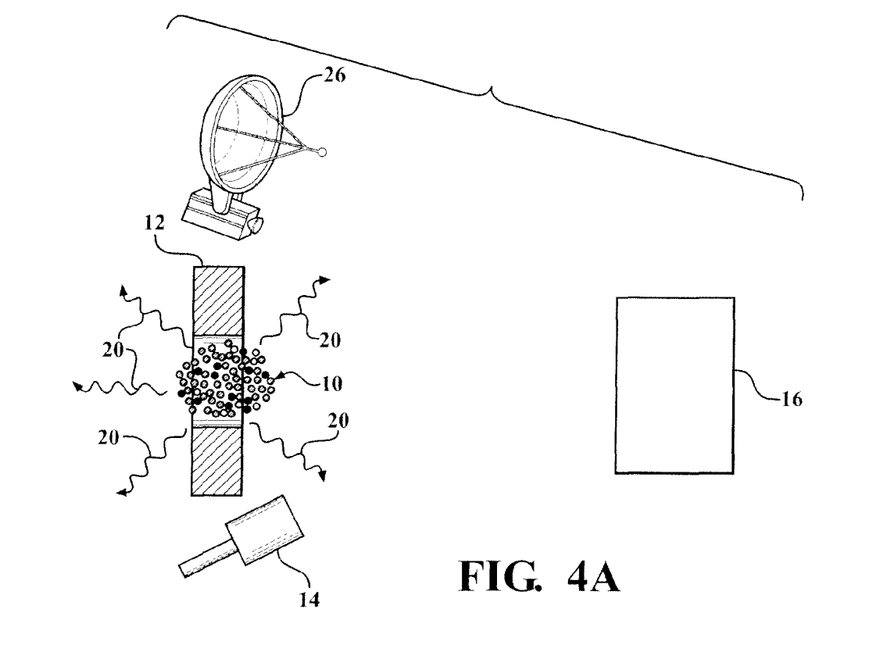
FIGS. 4A-C provide a sequential depiction of the neutron irradiation and gamma ray detection process according to this invention, as the cloud of neutrons emitted during a pulse elongates as it travels toward a target.
Figure 4B:
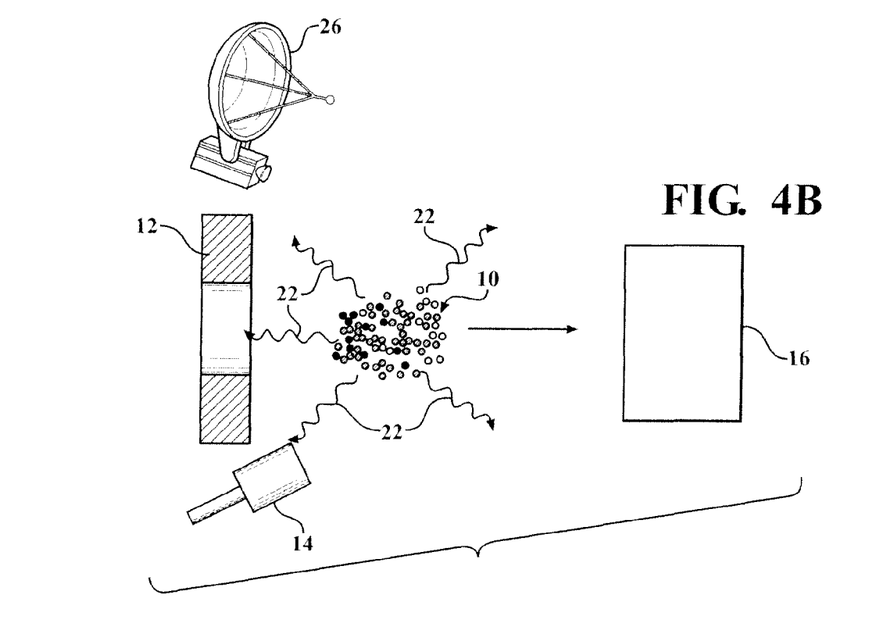
Figure 4C:
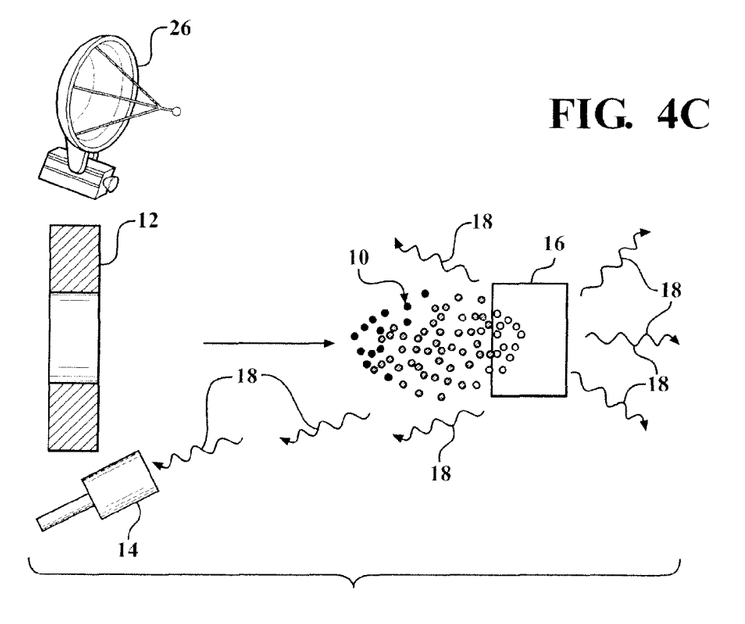

When a substance of interest is dosed with neutrons 10, gamma rays of interest 18 are produced in a process that has been well documented. In addition to these gamma rays of interest 18, the neutrons 10 also produce unwanted or nuisance gamma rays, including fratricidal gamma rays 20 and backshine (also known as sparkle) gamma rays 22. Fratricidal gammas 20 are depicted in FIGS. 1 and 4A. Backshine gamma rays 22 are a result of interactions with atoms of atmospheric nitrogen-14. The phenomenon of atmospheric nitrogen gamma ray backshine 22 is illustrated in FIGS. 3 and 4B. These nuisance gamma rays 20, 22 are generally produced closer to the neutron source 12 and the gamma ray detector 14 than are the gamma rays of interest 18. For this reason, a sufficiently short pulse of cold, thermal or epithermal neutrons 10 will cause gamma rays from the neutron source (i.e., fratricidal gamma rays 20), from the illuminated cone of air (sparkle gamma rays 22) and from the substance of interest (gamma rays of interest 18) to arrive at the detector 14 at successively later times. This is because the emitted neutrons 10 arrive at the locations described at successively later times. FIGS. 4A-C represent a sequence in which a neutron pulse or cloud 10 leaves a neutron source 12 headed for a target 16 that is suspected to contain a substance of interest.

Figure 5:
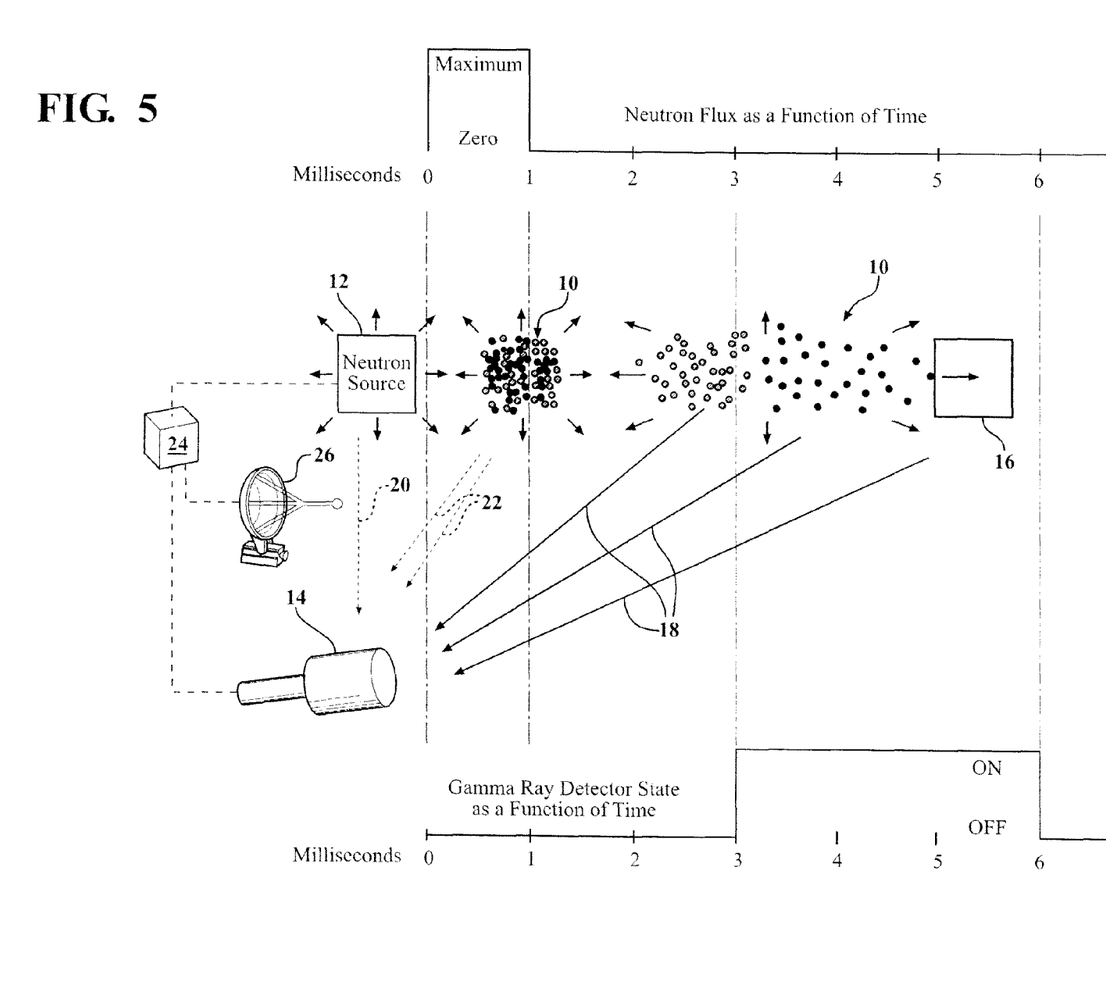
FIG. 5 is an exemplary time-based analysis showing one hypothetical duty cycle of a process according to this invention.

The cloud contains neutrons with a range of speeds distributed around a mean value, which corresponds to the "temperature" of the cloud. Although a cloud of thermal neutrons certainly has some very slow components that would qualify as cold and some fast ones that would qualify as epithermal, those terms are generally used to describe the temperature of the center of the velocity distribution, i.e., its characterized velocity spectrum, and not the outliers of a distribution. Thus, the longitudinal spread of neutrons 10 shown in FIGS. 4C and 5 is due to the velocity differences among the neutrons in the cloud 10. Thermal neutrons, for example, with mean energy of $4.05 \times 10^{-21}$ Joules=0.026 eV, have velocities distributed according to a Maxwell-Boltzmann distribution, with mean velocity of 2,200 meters per second, corresponding to a "room temperature" of 298.16 Kelvins and a momentum of $3.68 \times 10^{-24}$ kg-m/sec.

FIG. 4A shows the neutron pulse or cloud 10 leaving the neutron source 12, and the source 12 itself making fratricidal gamma rays 20. The gamma ray detector 14 is not sensing these nuisance gamma rays 20 during this time, because it has not been turned to its ON mode by the control mechanism 24. In FIG. 4B, the neutrons 10 are in flight toward the target 16. Backshine gamma rays 22 are created during this phase. Still the gamma ray detector 14 remains in its OFF mode. FIG. 4C shows the neutrons 10 producing gamma rays of interest 18 by colliding with a substance of interest contained in or around the target 16. The gamma ray detector 14 is switched to its ON mode by the control mechanism 24, and the gamma ray detector 14 then detects these gamma rays of interest 18. The gamma rays 18-22 generally travel very fast—at or near the speed of light. The only significant quantities of nuisance gamma rays 20 and 22 reaching the detector 14 while it is switched ON originate from the vicinity of the target itself, rather than from the full collection of possible sources in the environment, thus substantially reducing the problem of noise in the gamma ray detector 14.

If the approximate distance to the target 16 is known, then the duration of a pulse of neutrons 10 and the amount of time before the next pulse is generated can both be tailored to allow the gamma rays 18 from the substance of interest to arrive at the gamma ray detector 14 during times when the smallest number of nuisance gamma rays 20, 22 are also arriving. The result is a maximization of the signal-to-noise ratio (SNR).

The gamma ray detector 14 is switched ON or told to stop disregarding the gamma rays by the control mechanism 24. A calculation is made to determine the moment the bulk of the neutrons 10 arrive at the target 16 based on the neutron time of flight (NTOF) and the extent to which the cloud of neutrons has spread due to the spectrum of neutron velocities within it. Distance between the neutron source 12 and the target 16 is determined by a target range detector 26. The gamma ray detector 14 continues to sense the gamma rays of interest 18 for nominally the entire time the substance of interest in the target 16 is being illuminated by substantial numbers of neutrons 10. During this time, the gamma rays of interest 18, which travel at the speed of light, are arriving at the gamma ray detector 14. Connections between the control mechanism 24, the neutron source 12, the gamma ray detector 14, and the target range detector 26 are shown as broken lines.

The flux of neutrons emitted from the source 12 is controlled by commands from the control mechanism 24, which may comprise a computer running appropriate control software. The connection between the neutron source 12 and the control mechanism 24 may be either unidirectional, in which commands pass from the control mechanism 24 to the neutron source 12, or bidirectional, in which control and/or status information pass in both directions between the two components. Between pulses, the neutron source 12 is either switched OFF or else switched to a very low value. When the neutron source 12 is either switched OFF or switched to a very low neutron flux, the fratricidal gamma rays 20 either cease entirely or drop to a very low flux.

The gamma ray detector 14 is designed to sense gamma rays of interest 18. When in its ON mode, the detector will also detects nuisance gamma rays 20 and 22, since it is impossible or impractical to design a detector that will selectively reject all nuisance gamma rays. The detector 14 can be switched ON and OFF by the control mechanism 24. Alternatively, the detector 14 may instead be configured to remain powered ON at all times but commanded by the control mechanism 24 to regard or disregard (i.e., IGNORE) gamma rays 18-22 at the respective times. This latter alternative is intended within the meaning of ON and OFF modes of the detector 14. The connection between the gamma ray detector 14 and the control mechanism 24 may be either unidirectional, in which commands pass from the control mechanism 24 to the gamma ray detector 14, or bidirectional, in which control and/or status information pass in both directions between the two components.

The control mechanism 24 sends commands to both the neutron source 12 and the gamma ray detector 14. In the case of the neutron source 12, these commands may specify a level of neutron flux emitted. In the case of the gamma ray detector 14, these commands may specify the state of that component regarding either its ON/OFF state or its regarding or IGNORING of gamma rays, depending on the embodiment. In addition, other commands may be issued, such as system commands, self-test, diagnostic, etc. In addition to commands being sent by the control mechanism 24, optionally, status information may be sent from either the neutron source 12 or the gamma ray detector 14, or both. Such status information may either be sent upon request of the control mechanism 24 or autonomously by either or both of the neutron source 12 and the gamma ray detector 14. The control mechanism 24 is preferably a computer controlled device of the type commercially available and readily adapted for use in this invention by those of skill in the art.

In one embodiment, the control mechanism 24 receives encoded information that includes the distance to the target 16 as reported by the target range detector 26, the total gamma ray flux detected by the gamma ray detector 14 and the number of neutrons per second emitted by the neutron source 12. In one embodiment, the control mechanism 24 uses this encoded information to define a time cycle over which the neutron source 12 and the gamma ray detector 24 each completes a respective ON cycle and an OFF cycle. The control mechanism 24 further defines the percentage of said time cycle that the neutron source 12 is ON (i.e., the neutron source "duty cycle"), the percentage of said time cycle that the gamma ray detector 14 is ON (i.e., the gamma ray detector "duty cycle"), and the delay time between when the neutron source turns ON and the gamma ray detector turns ON. As will be apparent to one skilled in the art, the duty cycles will generally be different for the neutron source 12 than for the gamma ray detector 14, since, on the one hand, the neutron source 12 works with comparatively slow nuclear particles, and on the other hand, the gamma ray detector 14 works with gamma rays traveling at the speed of light.

The target range detector 26 measures the distance between the neutron source 12 and the substance of interest 16 and makes such determinations available to the control mechanism 24 either upon query by the control mechanism 24, on a schedule determined by the operating parameters, or continuously. An optional imaging sensor (e.g., a video camera or its functional equivalent) may be paired with the target range detector 26. The optional imaging sensor and the target range detector 26 collect and transmit range and image data to the control mechanism 24. The target range detector 26 is effective to detect the range from the neutron source 12 to the target 16, and may be of the electromagnetic wave type, optical type, sonic type, acoustic type, or a hybrid system based on one or more single-modality-systems. By knowing the speed, or average speed, of the neutron cloud 10 and the distance to the target 16, the NTOF can be computed.

Referring now to the time-based chart of FIG. 5, a theoretical example is provided in which a beam of thermal neutrons 10 with an average speed of 2,200 meters per second is aimed at a target 16 containing a substance of interest located approximately 11 meters away from the source 12. In this example, the neutrons 10 are sent out in a pulsed beam that is turned ON for 1 millisecond and OFF for 5 milliseconds. Further, in this example, the gamma ray detector 14 is turned OFF for 3 milliseconds and then ON for 3 milliseconds. This pattern may be repeated every 6 milliseconds. (The distance of 11 meters here chosen to result in round numbers for this illustrative example.) As depicted in this Figure, the neutrons spread within the cloud 10 due to their differing velocities. The faster neutrons naturally reach the target 16 earlier than the slower moving neutrons. As a result, it is foreseeable that at most extended ranges, the ON (i.e., pulse) time of the gamma detector 14 will exceed the ON (pulse) time of the neutron source 12.

More specifically, the neutrons 10 in any given pulse (here shown as a 1-millisecond pulse) have a spectrum of energies distributed according to a Maxwell-Boltzmann distribution, with mean energy of 0.027 electron volts, corresponding to a speed of about 2,200 meters per second. As the "cloud" of neutrons produced during this pulse moves away from the source 12 and detector 14, it spreads out in the direction of travel, with the faster neutrons' moving ahead of the cloud's center and the slower ones' falling further behind the cloud's center. In FIG. 5, the faster neutrons are shown as solid black circles and the slower moving neutrons with cross-hatching. Only two neutron speeds (fast and slow) are shown here for convenience, it being understood that in the typical neutron cloud 10 there will likely be a dispersion of velocities. By the time the cloud 10 arrives at the target 16 (11 meters away from the source 12), it is somewhat stretched or longer in the direction of travel than it was when it was emitted, due to the range of neutron velocities in the cloud 10.

Figure 6A:
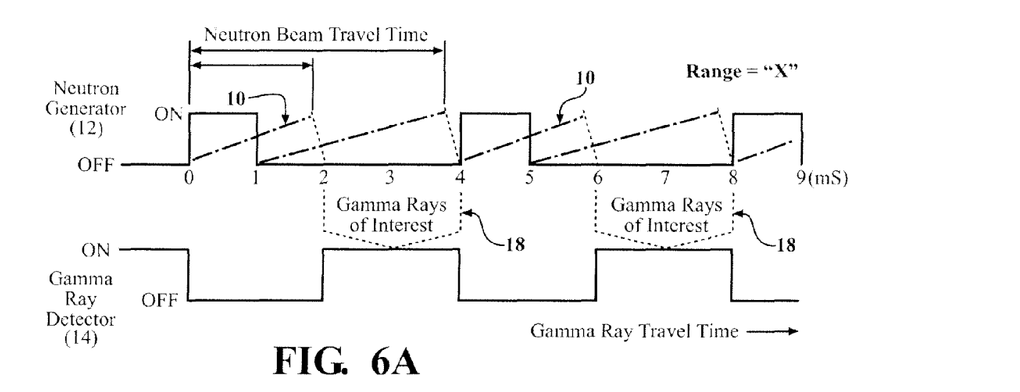
FIGS. 6A-C provide simplified timing diagrams illustrating in somewhat exaggerated fashion the manner in which gamma detector switching times may be functionally related to target range as a result of the differing neutron velocities within a typical neutron cloud.
Figure 6B:
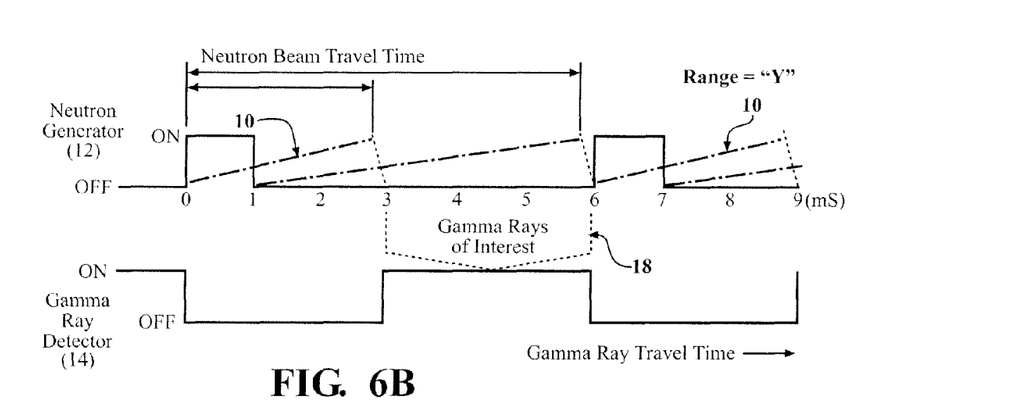
Figure 6C:
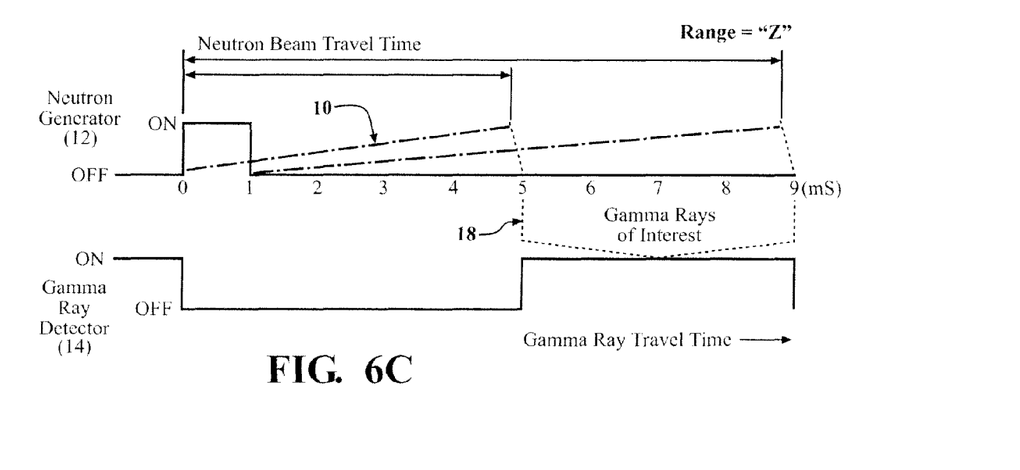

FIGS. 6A-C shows, in generalized fashion, the manner in which the gamma ray detector 14 switching times are preferably altered by the control mechanism 24, on the fly, as a function of target range. FIG. 6A represents a situation in which the substance of interest 16 is relatively close (Range "X") to the neutron source 12, and as a result the differing neutron velocities within the cloud 10 do not result in a significant degree of longitudinal spread. The gamma ray detector 14 is gated ON for a time equal to the duration of the neutron source pulse plus an additional calculated time to account for the longitudinal spreading of the neutron cloud 10 due to the distribution of velocities within it, and corresponding to the distribution of neutron arrival times at the target 16. In FIG. 6B, the range (Y) is greater than that of FIG. 6A, resulting in the fact that the arrival times of the respective fastest and slowest neutrons in the neutron cloud 10 are more longitudinally (and temporally) dispersed. The interval between gating of the neutron source 12 ON is thus longer (i.e, lower frequency pulsing), due to the increased travel times of the neutrons to a more distant substance of interest 16. In FIG. 6C, the range to target 16 is further still, causing an even more noticeable spread in the time during which gamma rays of interest 18 can be expected to arrive at the detector 14. Thus, the gamma ray detector 14 can be constrained in its OFF condition beginning with the initiation of the neutron source pulse plus a time delay generally equal to the range divided by the speed of the fastest foreseeable neutrons in the cloud 10 (i.e., the fastest reasonable NTOF). The gamma ray detector 14 is then switched ON, and maintained in this ON condition for a period of time generally equal to the neutron source pulse duration plus the time of flight for the bulk of the neutrons in the cloud 10. In other words, the gamma ray detector 14 is constrained in its OFF mode at the initiation of the neutron source pulse period plus a time delay generally equal to the neutron source pulse duration plus the fastest reasonable NTOF plus an additional time period generally equal to the time difference between the fastest reasonable NTOF and the slowest reasonable NTOF.

In this example, fratricidal gammas 20 are produced by the neutron source 12 during the 1 millisecond length of the pulse. These fratricidal gammas 20 arrive at the gamma ray detector 14 virtually instantaneously, as they are produced before the neutrons 10 even leave the generator 12. However, these fratricidal gamma rays 20 are not reported by the gamma ray detector 14 because it is in the OFF mode when they arrive. Atmospheric backshine gamma rays 22 are produced as the cloud of neutrons 10 moves through the air toward the target 16. These backshine gamma rays 22 are also not reported by the gamma ray detector 14, since it is shut OFF for the first several milliseconds of the 6-millisecond total cycle.

As can be seen in FIG. 2, due to the broadening of the pulse of thermal neutrons due to the velocity spectrum, the leading edge of the cloud's center arrives at the target 16 approximately 3 milliseconds after leaving the source 12 (time required to cover the hypothetical 11 meter spacing). The trailing edge of the cloud's center arrives 2 milliseconds later, or approximately five milliseconds after leaving the source 12. Although some neutrons 10 arrive both prior to and after this 2-millisecond "time window", the majority of neutrons 10 arrive during the window, as shown illustratively in both FIGS. 5 and 6.

The gamma ray detector 14 is switched ON during the 3-to-5 millisecond time window. Gamma rays 18 produced in the region of the target 16 arrive at the gamma ray detector 14 virtually instantaneously and are reported by the gamma ray detector 14. The proposed strategy minimizes the total number of gamma rays from sources other than the substance of interest that are reported by the gamma ray detector 14, thus maximizing SNR.

In real-world experience, as opposed to theoretical examples such as that given above, it may be necessary to adjust the pulses and ON/OFF cycle of both the neutron source 12 and/or the gamma ray detector 14 in order to maximize SNR in the face of the spreading neutron cloud 10, neutron cloud divergence, the thickness of the area being inspected, and other concerns. However, laboratory experiments have demonstrated that the differences between theoretical predictions of the best pulse timing and empirical results may be acceptably small. The time constants involved (mean neutron speed on the order of 0.455 milliseconds per meter), the distances involved (up to about 20 meters), and the pulsing rate (on the order of 167 hertz with 67% dead-time) are all reasonable and achievable for most contemplated applications.

In other disciplines, such as radar and sonar, the synchronization of a detector with modulations in the strength of an interrogating signal is referred to as "pulse gating". That terminology is borrowed and applied here to the case of neutron analysis to underscore analytical and theoretical similarities with other detection modalities. However, neutron pulse gating differs from pulse gating in radar and sonar in several important ways, notably that, with these two sensing modalities, the interrogating signal and the return signal are of the same type, whereas with neutrons, they are very different, travel at very different speeds, and require different detection schemes.

Embodiments of the present invention include systems in which the neutron source 12 is pulsed, systems in which the gamma ray detector 14 is optionally time gated so as to literally not respond to gamma rays while the neutron flux is too high or the substance of interest is not being illuminated, and systems in which the gamma ray detector 14 is instructed to ignore the nuisance signals, despite the fact that it is physically sensing them.

Figure 7:
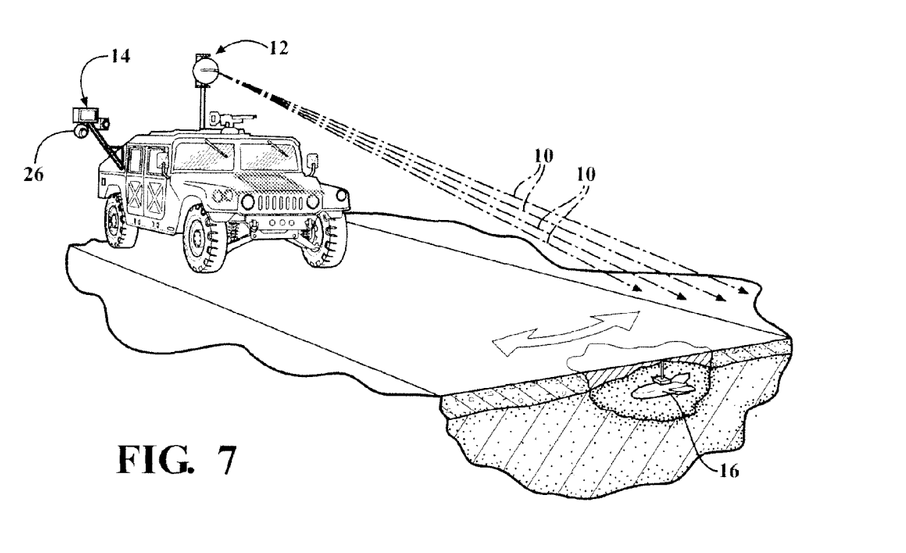
FIG. 7 shows a mobile application of the subject invention used in connection with explosive detection.
Figure 8:
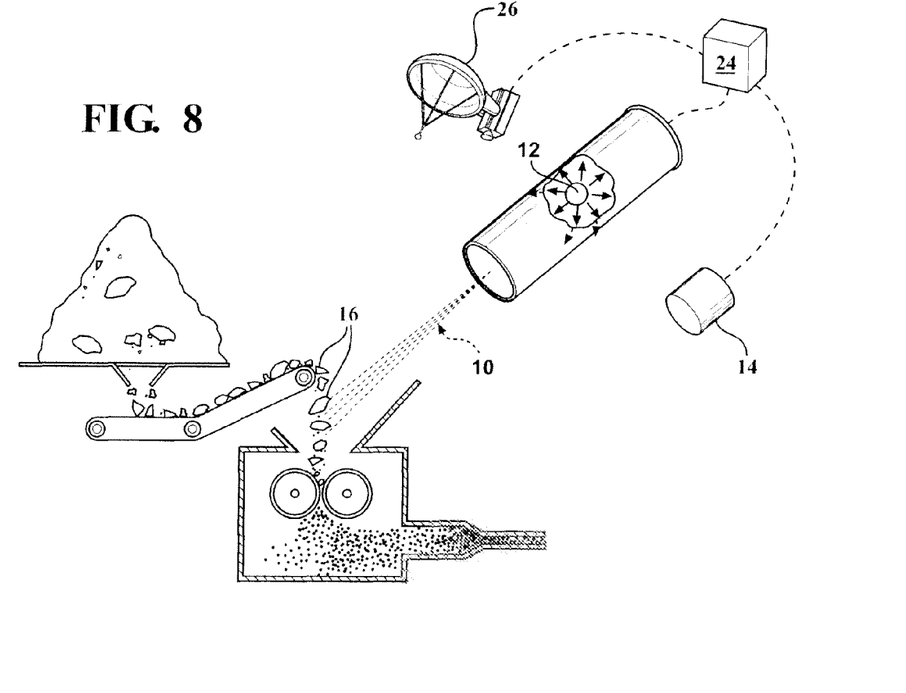
FIG. 8 is another exemplary application of the subject invention for grading coal.

FIGS. 7 and 8 illustrate exemplary applications of the subject methods and apparatus for detecting remote explosive substances (FIG. 7) in mobile applications and for grading coal (FIG. 8) as it moves along a conveyor belt. These are offered merely by way of example, and it is to be understood that many other applications of this technology are contemplated and will fall within the scope of the claims.

EXAMPLE

As a further example of one possible embodiment of the invention, one may consider a control mechanism 24 that includes a computer with a means of generating several channels of digital electronic pulses such as TTL (Transistor-Transistor Logic) pulse train generators, a collimated pulsed neutron source 12, a range-finding device 26 such as a RADAR or LIDAR gun directed along the path of the collimated neutron pulses, and a gamma ray detector 14 whose data acquisition can be gated ON or OFF by a digital electronic pulse. In this example, the computer (incorporated into or operated in conjunction with the control mechanism 24) may include a means of moving/controlling the pointing direction of the collimator on the neutron source 12 and the pointing direction of the range-finding device 26.

Continuing in this example, the computer aims the collimated neutron source 12 in a particular direction of interest or causes it to scan across a particular field of view, while directing the range-finding device 26 to simultaneously track along the same direction of view as the collimated neutron source 12. Every 100 milliseconds (for example) the computer queries the range-finding device 26 and records the distance in meters to the nearest solid object 16 in the neutron beam path 10. In response to this range data, the computer immediately directs its electronic pulse generators to adjust their pulse train patterns according to one or more straightforward instruction sets. Since the typical travel rate for the centroid of a pulse of thermal neutrons 10 is nearly 2200 meters per second, a reasonable set of instructions to the pulse train generators might appear as follows:

Instruction Set (1)
   Set t1=0.2×(D/2200 meter per sec),
   Set t2=1.0×(D/2200 meter per sec),
   Set t3=0.6×(D/2200 meter per sec),
   Set t4=0.6×(D/2200 meter per sec),
   Where:
   D is the distance to the solid object in meters, and
   t1, t2, t3, t4 are time intervals.

Generate a pulse train that will pulse the neutron source ON for duration t1, then OFF for duration t2, then repeat this pulse cycle for a duration of 100 milliseconds.

Generate a second pulse train, synchronized with the first pulse train, that will gate the gamma ray detector OFF for duration t3, then ON for duration t4, then repeat this pulse cycle for a duration of 100 milliseconds.
Instruction Set (2)

Every 100 milliseconds, repeat the control operation as follows:

Update the motion control instructions that steer the neutron source 12 and range-finder 26.

Query the range-finder 26 to find the distance to the first solid object 16 in the neutron path.

Recompute the neutron source 12 and gamma ray detector 14 time intervals and reset the pulse trains as indicated in Instruction Set (1) above.

The effect of these instructions, for example, when an object 16 is in view at range 11 meters, will be to turn on the neutron source for 1 millisecond, then turn off the neutron source for 5 milliseconds while the majority of the thermal neutrons pass into and through the object at range 11 meters. The gamma ray detector 14 is gated OFF during the first 3 milliseconds, which includes both the period when the neutron source is on and the period while a majority of the thermal neutrons have not yet reached the target range of 11 meters. Then the gamma ray detector is gated ON during the next 3 milliseconds, which includes the period of time when most of the neutrons will pass into and through the object at target range 11 meters. In this way, the gamma ray detector 14 will record far fewer nuisance gamma rays 20, 22 from the neutron source 12 and nearby air relative to the number of useful gamma rays 18 detected from the target range at 11 meters. As the target range changes from moment to moment when the field of view changes, the computer will update the gating every 100 milliseconds or so to maintain a nearly optimal signal-to-background ratio in this manner.

It should be clear to those practiced in the art that other embodiments of this invention could use any suitable automated directional range-finding technique in place of the LIDAR or RADAR; that any set of appropriate formulas/ instructions could replace those in Instruction Set (1) to optimize the signal-to-background ratio for a variety of different source/detector geometries and for neutrons with velocity distributions both faster and slower than thermal neutrons on average; that the update interval for the range-finder and pulse trains could be set to any suitable interval other than 100 milliseconds; that the synchronized digital pulse generators could be replaced with any equivalently functional mechanism to communicate a duty cycle or ratio of ON/OFF periods or similarly useful timing information to the synchronized time-gated neutron source and gamma ray detector; and that the collimated neutron source and range-finder could be fixed in a single orientation or could be controlled by the computer or by a live operator in pointing at different targets of interest or fields of view.

Thus, the invention relates generally to the use of flux modulation or "pulsing" of a neutron source 12 capable of emitting thermal, epithermal, and/or cold neutrons 10, as well as time-gating the gamma ray detector 14 in synchronization with the time of flight of a packet or cloud of neutrons 10, as a means to minimize signal noise, under the control of the control mechanism 24. The invention improves upon prior art techniques by pulsing the neutron beam 10 in such a way so as to improve the signal-to-noise ratio (SNR), by gating the gamma ray detector 14 in synchronization, and by the use of a control mechanism 24 to coordinate both systems. One result of pulsing the neutron beam 10 is that, during the pulses, the neutron flux varies from high to low. The neutrons 10 stimulate, or produce, the gamma rays 18-22, including both gamma rays of interest 18 and also fratricidal 20 and other nuisance gamma rays 22 from areas other than the target area 16 being inspected. During times when low neutron flux arrives at any particular location, the production of all types of gamma rays from such location 18-22, including both those that are interesting 18 and those that are noise 20, 22, is minimized. If the gamma ray detector 14 is commanded by the control mechanism 24 to ignore gamma rays 20, 22 arriving at times other than those during which gammas of interest 18 are physically able to arrive, then the SNR is improved.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A method for interrogating a remote target (16) with slow neutrons (10) to produce gamma ray fluorescence from targets that contain at least one specified substance of interest, said method comprising the steps of:
   providing a remotely located target (16);
   providing a slow neutron source (12) capable of generating at least one of thermal, epithermal, and cold neutrons, the neutron source (12) having power ON and OFF modes, the neutron source (12) operable in its ON mode to emit neutrons (10) capable of traveling over time and distance to reach the target (16) and there produce gamma rays of interest (18) upon interaction with a substance of interest, the travel time of the emitted neutrons (10) to the target (16) defining a neutron time of flight (NTOF);
   providing a gamma ray detector (14) proximate the neutron source (12), the gamma ray detector (14) having power ON and OFF modes and operable in its ON mode to detect gamma ray signals (18-22);
   powering ON the neutron source (12) for a pulse period and then powering OFF the neutron source (12); and
   constraining the gamma ray detector (14) in its OFF mode during the pulse period and for an immediately subsequent additional period of time generally equal to the NTOF, and then powering ON the gamma ray detector (14), whereby any unwanted nuisance gamma signals (20, 22) arriving at the detector (14) during the pulse period and during the subsequent NTOF period are not detected.

2. The method of claim 1, further including maintaining the neutron source (12) in its OFF mode while the gamma ray detector (14) is in its ON mode.

3. The method of claim 1, further including determining the distance between the neutron source (12) and the target (16) prior to said step of powering ON the gamma ray detector (14).

4. The method of claim 3 wherein the neutrons (10) emitted by the neutron source (12) have a Characterized velocity spectrum, and further including the step of calculating the NTOF as a function of the neutron velocity.

5. The method of claim 3 wherein said step of determining the distance between the neutron source (2) and the target (16) includes measuring electromagnetic radiation flow the target.

6. The method of claim 3 wherein said step of determining the distance between the neutron source (12) and the target (16) includes monitoring of the reflection of acoustic waves from the target (16).

7. The method of claim 3 wherein said step of determining the distance between the neutron source (12) and the target (16) includes optical sensing.

8. The method of claim 3 said step of determining the distance between the neutron source (12) and the target (16) includes at least one of infrared, terahertz, and millimeter wave techniques to determine range.

9. The method of claim 1, wherein said step of powering ON the gamma ray detector (14) occurs for a period of time generally equal to the pulse period of the neutrons and then powering OFF the gamma ray detector (14).

10. The method of claim 6, further including repeating said step of powering ON the neutron source (12) after said step of powering OFF the gamma ray detector (14).

11. The method of claim 1, wherein the neutron source (12) has a flux setting, and said step of powering ON the neutron source (12) includes varying the neutron flux setting.

12. The method of claim 1 wherein said step of powering OFF the gamma ray detector (14) includes IGNORING gamma rays (18-22) from all sources.

13. The method of claim 1 further including the step of providing a control mechanism (24) operatively associated with the neutron source and the gamma ray detector (14) for independently switching neutron source (12) and the gamma ray detector (14) between the respective ON and OFF modes.

14. The method of claim 1 wherein the neutrons (10) emitted by the neutron source (12) have a velocity spectrum that may be characterized by a fastest reasonable neutron velocity and a slowest reasonable neutron velocity, and wherein said step of constraining the gamma ray detector (14) in its OFF mode includes constraining, the gamma ray detector (14) to its OFF mode at the initiation of the neutron source pulse period plus a time delay generally equal to the neutron source pulse duration plus the fastest reasonable NTOF plus an additional time period generally equal to the time difference between the fastest reasonable NTOF and the slowest reasonable NTOF.

15. A method for interrogating a remote target (16) with slow neutrons (10) to produce gamma ray fluorescence from targets that contain at least one specified substance of interest, said method comprising the steps of:
providing a remotely located target (16);
providing a slow neutron source (12) capable of generating at least one of thermal, epithermal, and cold neutrons, the neutron source (12) having power ON and OFF modes, the neutron source (12) operable in its ON mode to emit neutrons (10) traveling at a spectrum of velocities over time and distance to reach the target (16) and there to produce gamma rays (18) upon interaction with a substance of interest, the travel time of the emitted neutrons (10) to the target (16) defining a neutron time of flight (NTOF), the characterized velocity spectrum including a fastest reasonable neutron velocity and a slowest reasonable neutron velocity;
providing a gamma ray detector (14) proximate the neutron source (12), the gamma ray detector (14) having power ON and OFF modes and operable in its ON mode to detect gamma ray signals (18-22);
providing a control mechanism (24) operative to selectively switch the neutron source (12) between its power ON and OFF modes and to independently switch the gamma ray detector (14) between its power ON and OFF modes;
powering ON the neutron source (12) via the control mechanism (24) for a pulse period and then powering OFF the neutron source (12);
constraining the gamma ray detector (14) in its OFF mode via the control mechanism (24) at the initiation of the neutron source pulse period plus a time delay generally equal to the neutron source pulse duration plus the fastest reasonable NTOF plus an additional time period, generally equal to the time difference between the fastest reasonable NTOF and the slowest reasonable NTOF; and then powering ON the gamma ray detector (14) via the control mechanism (24); maintaining the neutron source (12) in its OFF mode via, the control mechanism (24) while the gamma ray detector (14) is in its ON mode;
determining the distance between the neutron source (12) and the remote target (16) prior to said step of powering ON the gamma ray detector (14) and
repeating said step of powering ON the neutron source after said step of powering OFF the gamma ray detector (14).

16. An apparatus for interrogating a remote target (16) with slow neutrons (10) to produce gamma ray fluorescence when the target (16) contains at least one specified substance of interest, said apparatus comprising:
a slow neutron source (12) capable of producing at least one of thermal, epithermal, and cold neutrons, said neutron source (12) having ON and OFF modes and operable in said ON mode to emit neutrons (10) capable of producing gamma rays (18) upon interaction with a substance of interest, the travel time of the emitted neutrons (10) to the target (16) defining a neutron time of flight (NTOF);
the emitted neutrons (10) having a velocity spectrum characterized by a fastest reasonable neutron velocity and a slowest reasonable neutron velocity;
a gamma ray detector (14) configured to recognize gamma ray signals (18-22), said detector (14) having ON and OFF modes and operable in said ON mode to detect gamma rays (18-22);
a target range detector (26) configured to calculate the distance between the neutron source (12) and the remote target (16);
a control mechanism (24) operatively interconnecting said neutron source (12), said gamma ray detector (14) and said target range detector (26), said control mechanism (24) operable to power ON said neutron source (12) for a pulse period then power OFF the neutron source (12) while constraining said gamma ray detector (14) in its OFF mode for a period of time generally equal to said neutron source's pulse period plus the fastest reasonable NTOF plus an additional time period generally equal to the time difference between the fastest reasonable NTOF and the slowest reasonable NTOF and then immediately powering ON the gamma ray detector (14).

17. An apparatus according to claim 16, wherein said target range detector (26) includes at least one of a RADAR and LIDAR device.

18. An apparatus according to claim 16, wherein said neutron source (12) includes a collimated pulsed neutron source (12).

19. An apparatus according to claim 16, wherein said neutron source (12) includes a directionally aimable pulsed neutron source (12).

20. An apparatus according to claim 19, wherein said target range detector (26) includes a directionally aimable target range detector (26), and wherein said control mechanism (24) is operable to synchronize direction movements of said range detector (26) and said pulsed neutron source (12).

* * * * *